May 2, 1944.　　　F. J. TILLMAN　　　2,347,720
CALCULATING MACHINE
Filed April 3, 1937　　　11 Sheets-Sheet 2

INVENTOR.
F. J. Tillman
BY Rippey & Cassidy
HIS ATTORNEYS.

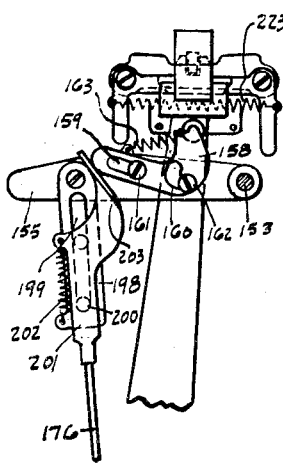
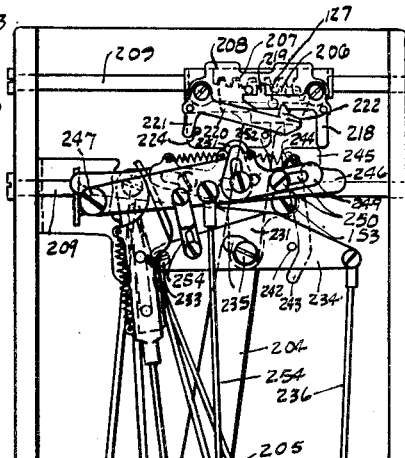
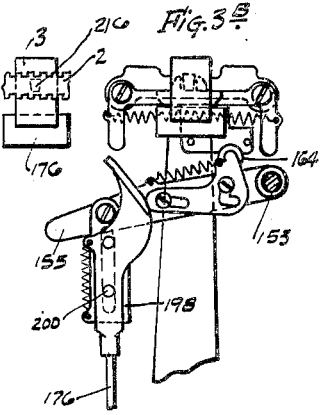
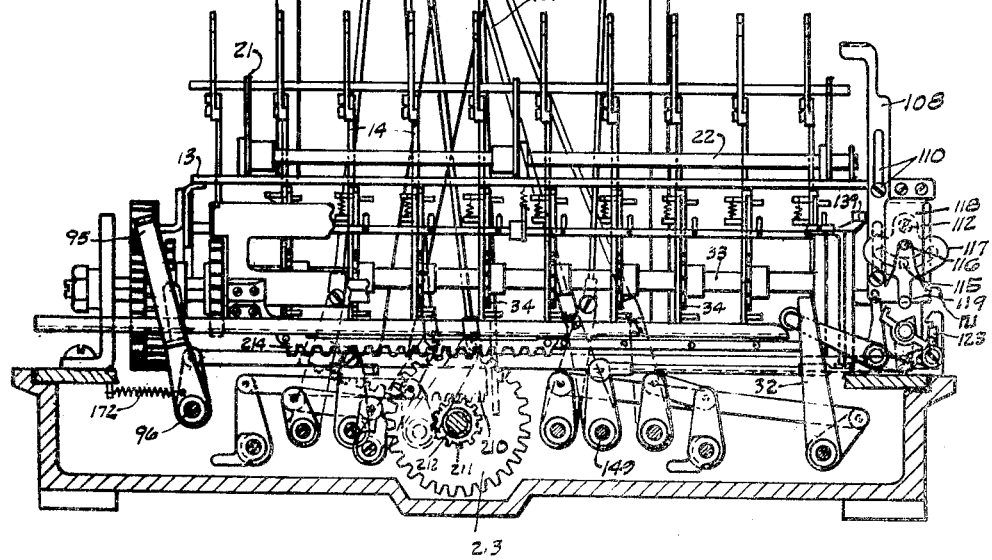

May 2, 1944.   F. J. TILLMAN   2,347,720
CALCULATING MACHINE
Filed April 3, 1937   11 Sheets-Sheet 4
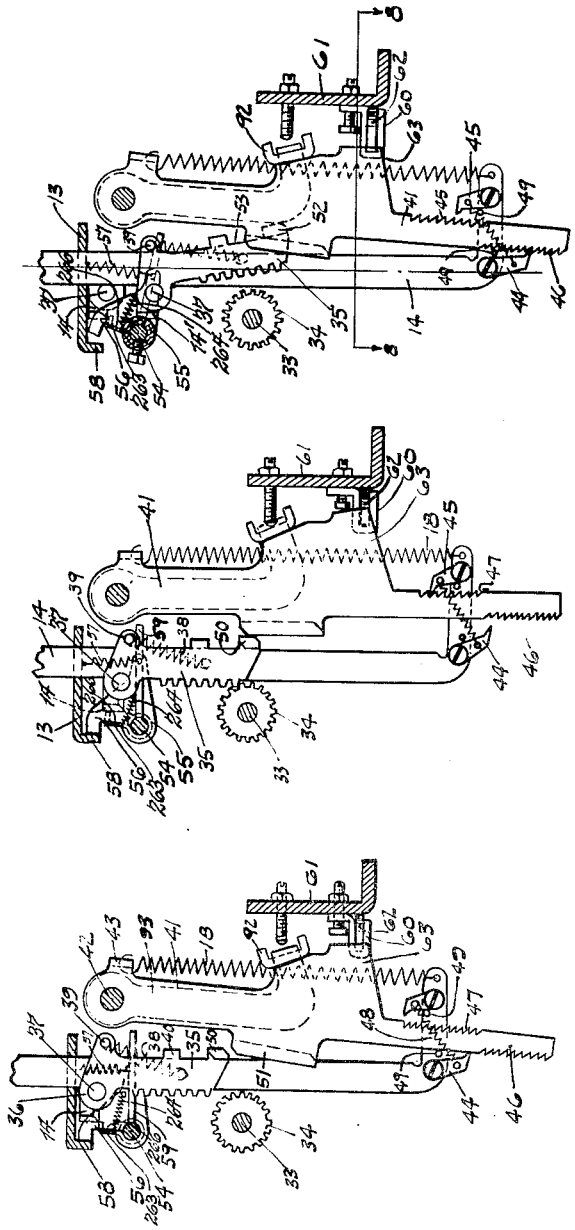
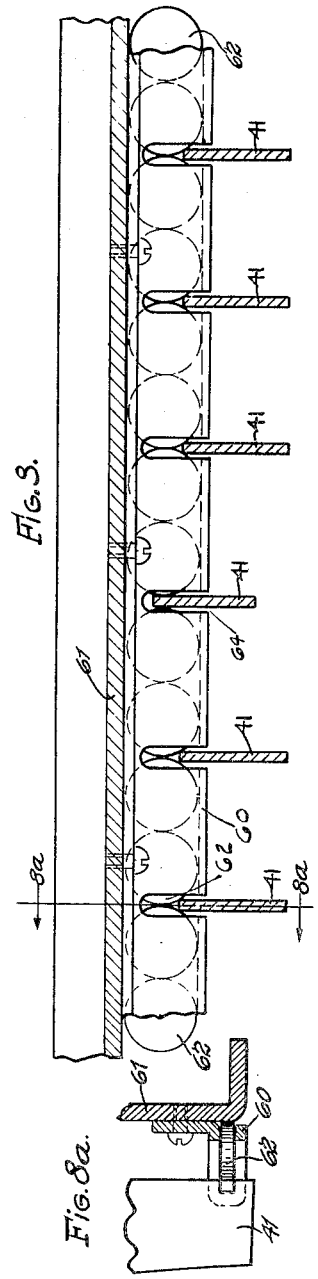
INVENTOR.
F. J. Tillman
BY Rippey & Cassidy
HIS ATTORNEYS May 2, 1944.　　　F. J. TILLMAN　　　2,347,720
CALCULATING MACHINE
Filed April 3, 1937　　11 Sheets-Sheet 5
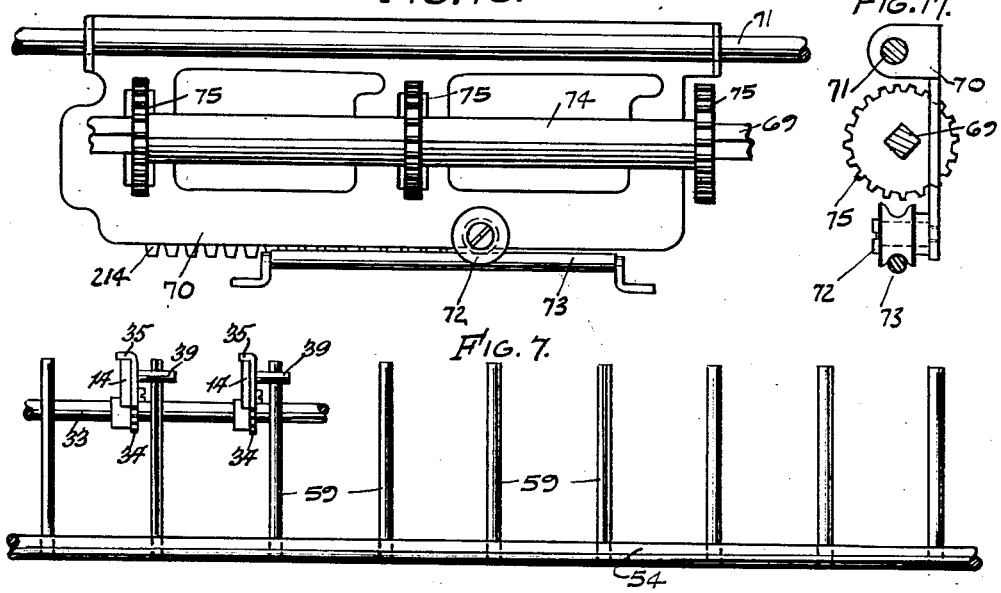
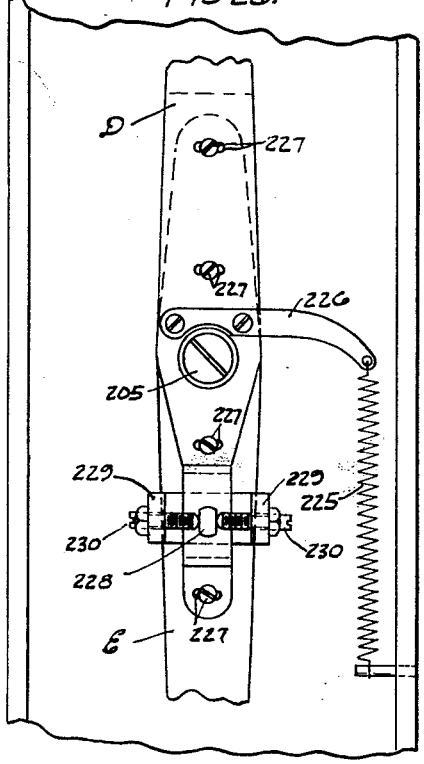
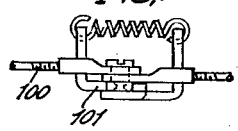
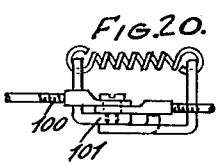
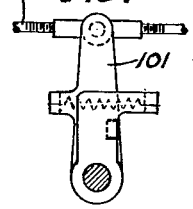
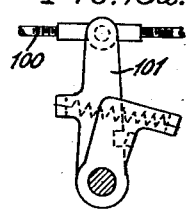
INVENTOR.
F. J. Tillman
BY Rippey & Cassidy
HIS ATTORNEYS.

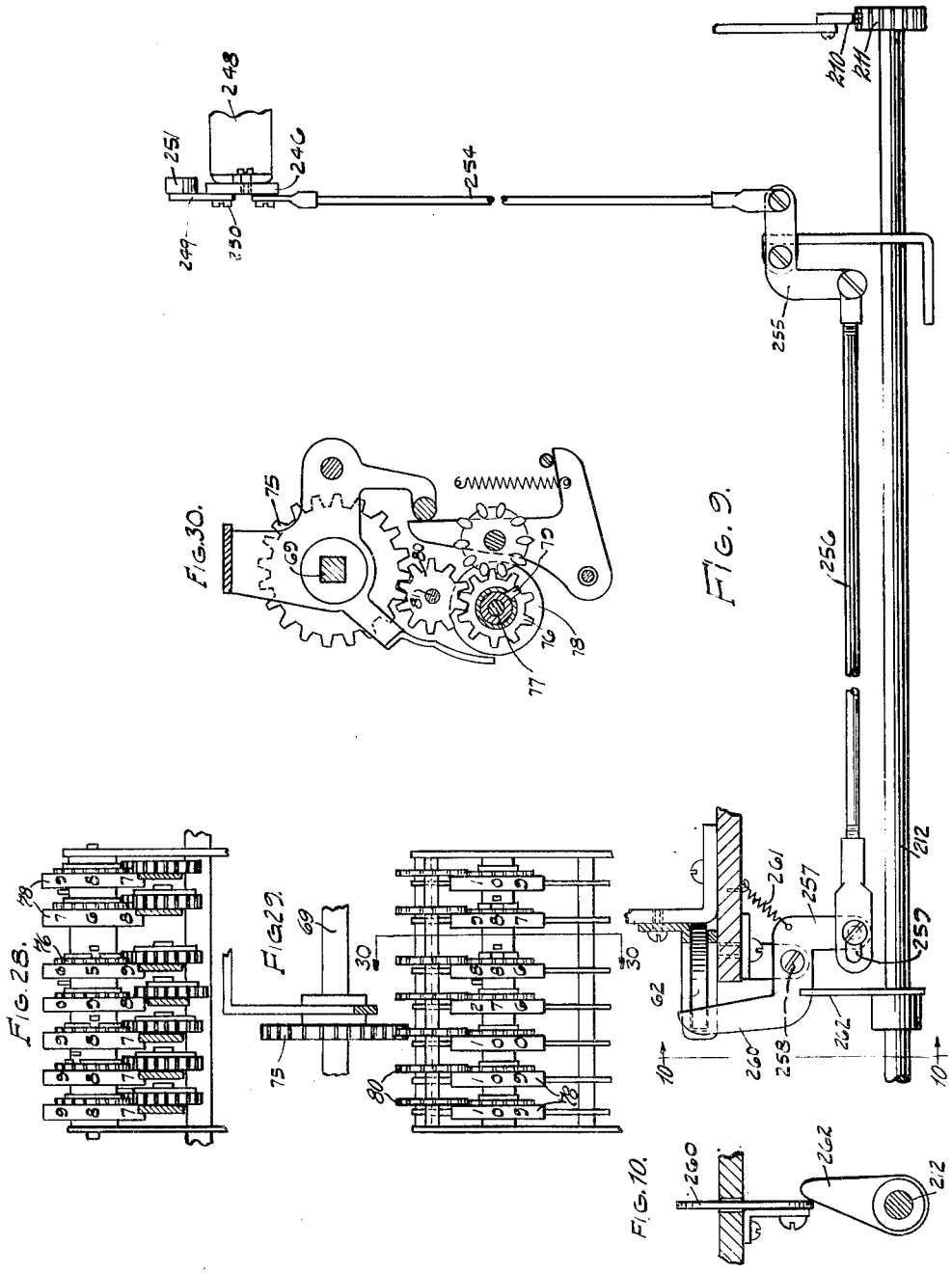

May 2, 1944.  F. J. TILLMAN  2,347,720
CALCULATING MACHINE
Filed April 3, 1937   11 Sheets-Sheet 7
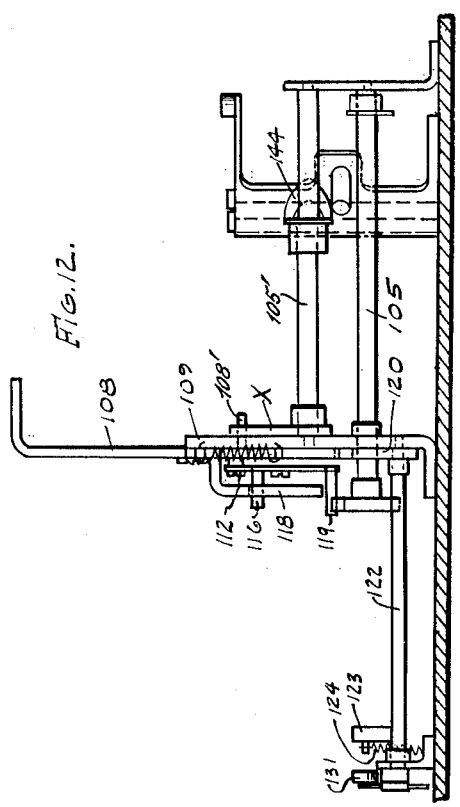
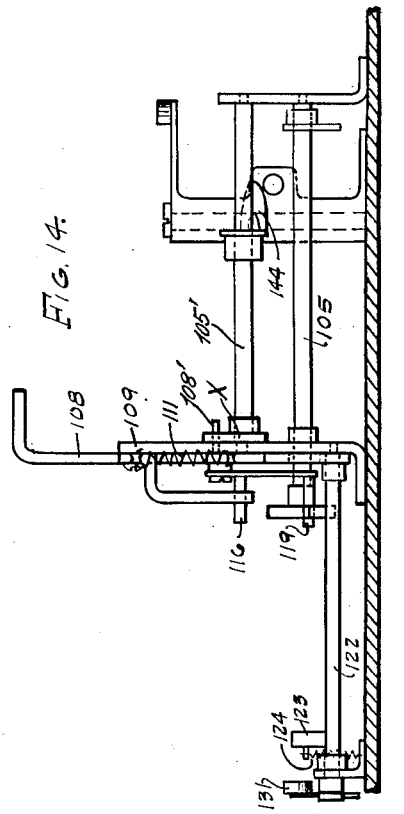
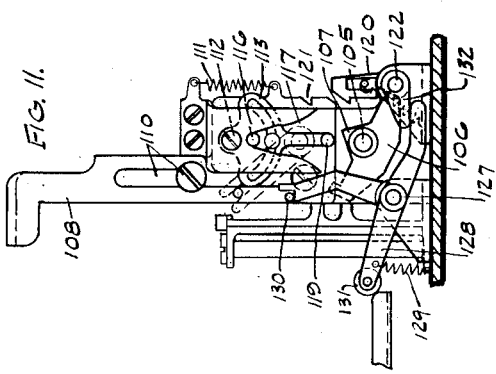
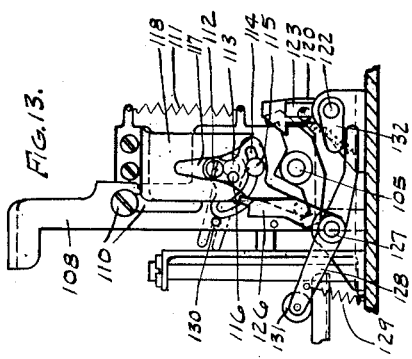
INVENTOR.
F. J. Tillman
BY Rippey & Cassidy
HIS ATTORNEYS.

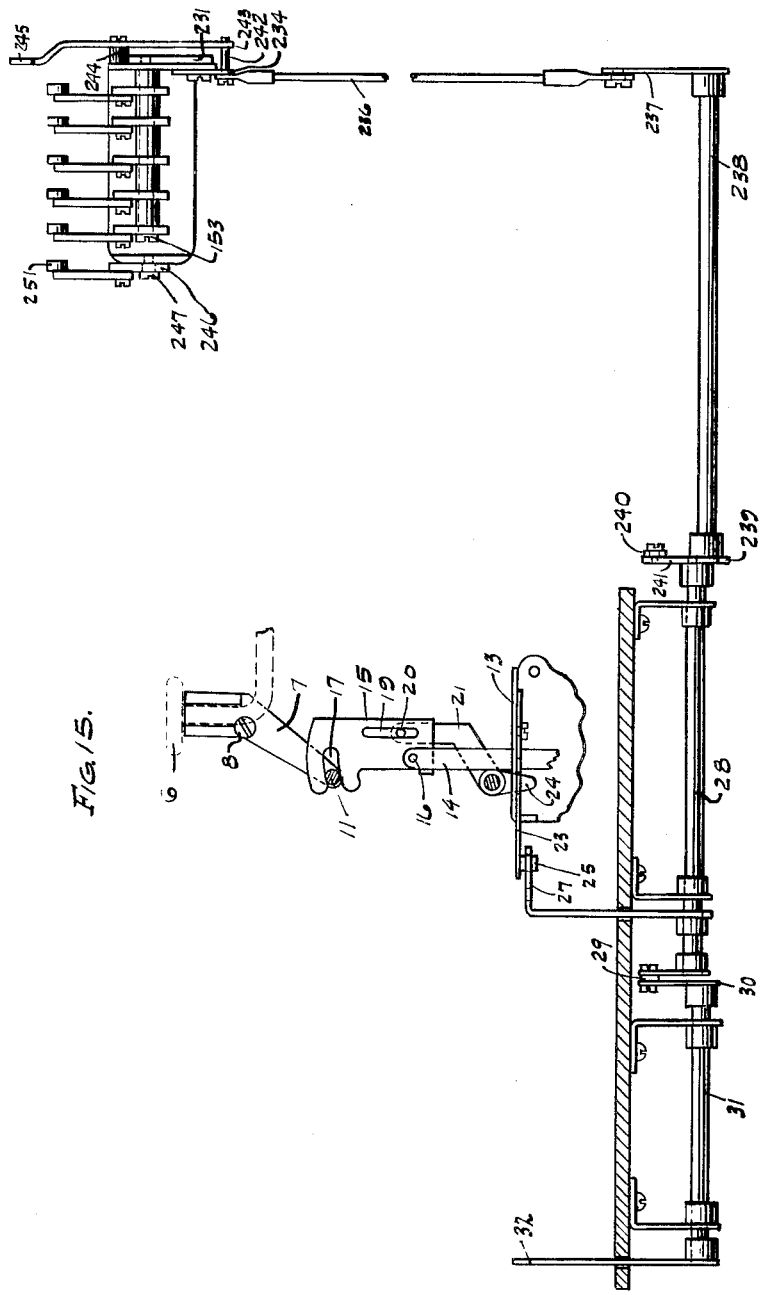

May 2, 1944.　　F. J. TILLMAN　　2,347,720
CALCULATING MACHINE
Filed April 3, 1937　　11 Sheets-Sheet 9
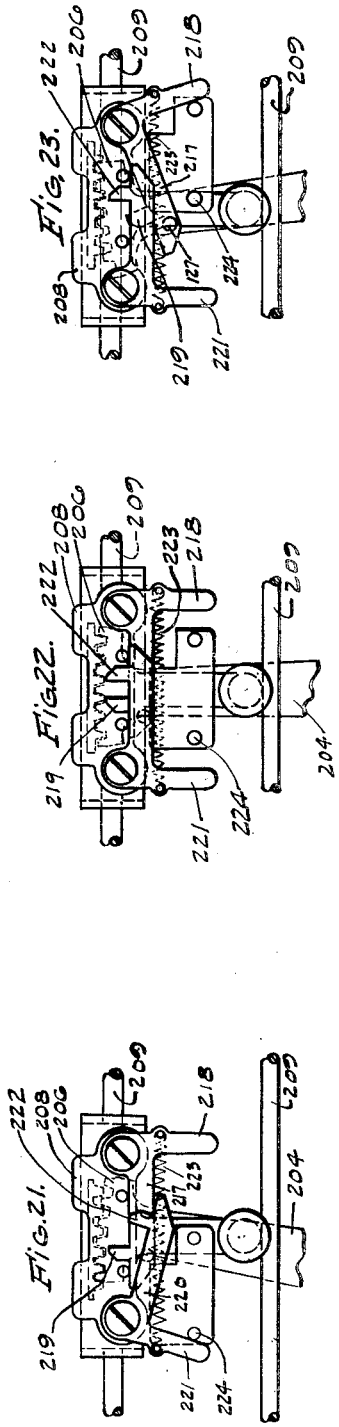
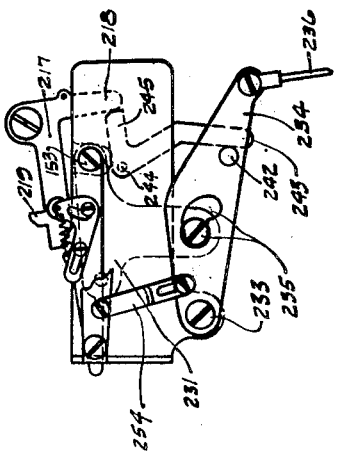
INVENTOR.
F. J. Tillman
BY Rippey & Cassidy
HIS ATTORNEYS.

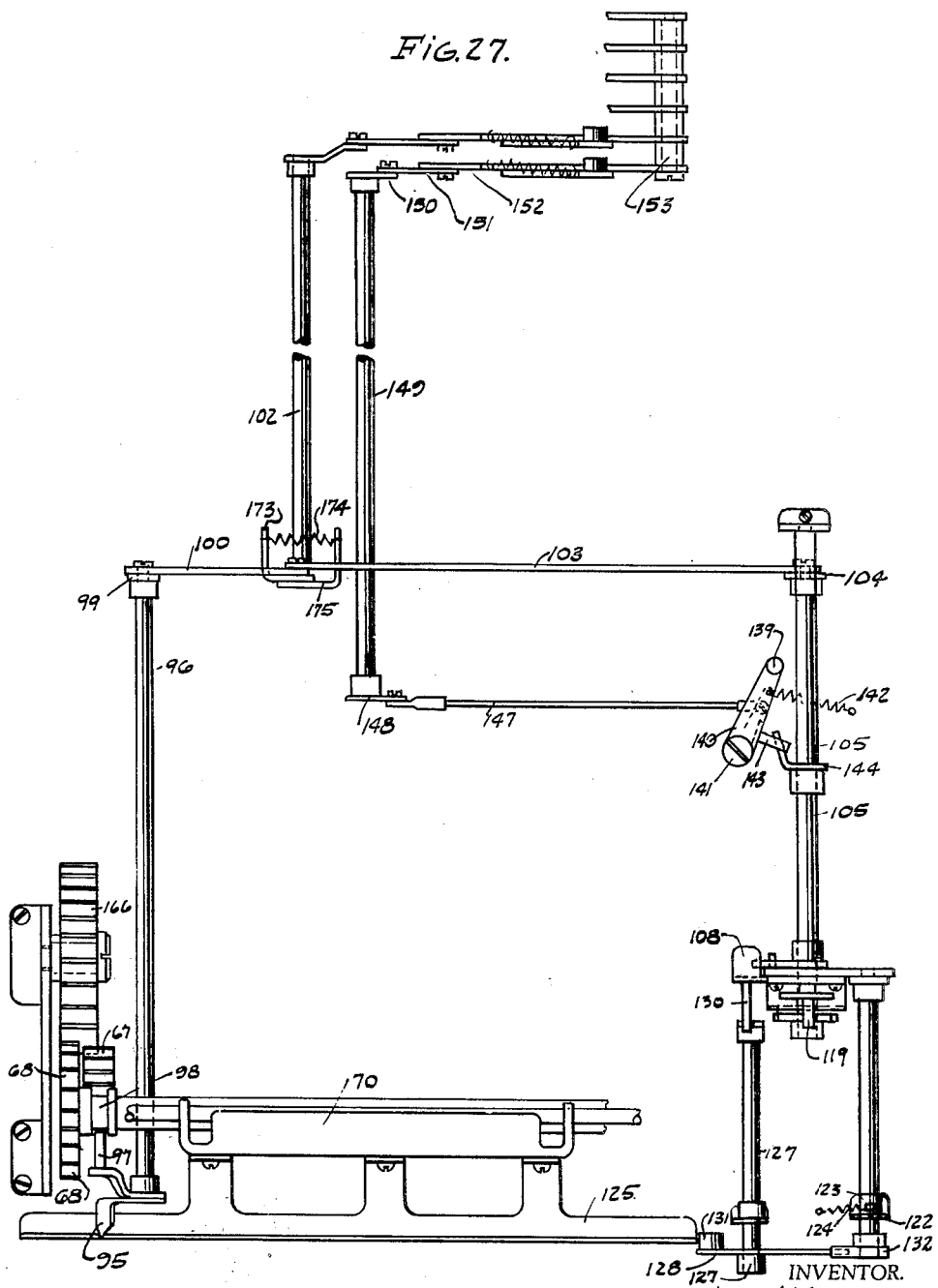

Patented May 2, 1944

2,347,720

UNITED STATES PATENT OFFICE 2,347,720

CALCULATING MACHINE

Ferdinand J. Tillman, St. Louis, Mo.

Application April 3, 1937, Serial No. 134,818

18 Claims. (Cl. 235—59)

This invention relates to calculating machines; and it has special reference to calculating mechanisms constructed and adapted for connection with typewriting machines, so that the calculating devices will be operated under control of the numeral keys of the typewriting machines.

Objects of the invention are to provide a device including a number of independently operative calculating mechanisms, with connections for operating the same selectively by the numeral keys of a typewriting machine with which the invention is designed and adapted to cooperate; to provide means under control of the usual laterally movable paper carriage of the typewriting machine for selecting the respective calculating mechanisms to be operated by the numeral keys of the cooperative typewriting machine; to provide in the invention an improped credit balance device whereby accurate balances of credits and debits may be automatically maintained as an incident to the proper operation of the typewriting machine, and the paper carriage thereof whereby tabulating movements of the carriage locates in proper different columnar positions the forms or record sheets mounted in the carriage so that, when the typewriting mechanism is operated to record the proper entries in the different columns, the appropriate and corresponding calculating mechanisms will be operated and thereby maintain correct totals and balances in the respective calculating mechanisms; to provide improved and conveniently operative automatic and manipulative connections for establishing and maintaining a proper cooperating relationship throughout the machine, both preparatory for and during operation of the typewriting machine; to provide means for preventing improper operation of any of the calculating mechanisms and for assuring proper operation of the calculating mechanisms which should be operated under control of the typewriting keys as determined by the position of the paper carriage, or independently of the position of the paper carriage as desired; and otherwise to simplify construction and mode of operation of the device, and to prevent improper operation thereof.

Another object of the invention is to provide an improved calculating mechanism that overcomes many or all of the objectionable features in calculating machines heretofore designed and intended for use in connection with standard typewriting machines.

Various other objects and numerous advantages of the invention should be readily apparent from the following description, reference being made to the annexed drawings, in which—

Fig. 3 is a front elevation of the present invention apart from the typewriting machine, the base portions being in section and, in part, broken away.

Fig. 3a is a front elevation showing the selector for one of the accumlating mechanisms disabled while its support remains in its idle position.

Fig. 3b is a similar view showing the controlling bracket for the selector lever disabled.

Fig. 4 is an enlarged view of a portion of the key operated mechanism and the full stroke devices therefor in their normal or unoperated positions.

Fig. 5 is a view of the same mechanism and devices that are shown in Fig. 4 in position to prevent a second operation thereof before the parts and devices have returned to their normal or unoperated positions.

Fig. 6 is a view of the same parts and devices that are shown in Figs. 4 and 5, showing their inter-engagement for preventing another operation thereof until they have returned to their normal or unoperated positions after having once been operated.

Fig. 7 is a plan view of the device for releasing the key supported racks from the pinions to be operated thereby, which release is effected after the keys have completed their full downward stroke.

Fig. 8 is a sectional view approximately on the line 8—8 of Fig. 6, showing the devices for preventing simultaneous operation of more than one typewriter numeral key.

Fig. 8a is a cross-sectional view on the line 8a—8a of Fig. 8.

Fig. 9 is a sectional view showing means cooperative with the key-locking devices to prevent operation of the typewriter numeral keys when the typewriter carriage is in the decimal position, as in position for writing a decimal point or period; for instance, between dollars and cents digits.

Fig. 10 is a cross-sectional view on the line 10—10 of Fig. 9.

Fig. 11 is a front elevation of the credit balance key and its immediately associated elements in their idle or unoperated positions.

Fig. 12 is a side elevation thereof.

Fig. 13 is a front elevation of the same devices that are shown in Fig. 11 but in their operated positions.

Fig. 14 is a side elevation of the devices shown in Fig. 13.

Fig. 15 is a view supplementing Fig. 1, showing means for disconnecting from the typewriter numeral keys the devices for operating the calculating mechanisms of the machine.

Fig. 16 is a front elevation of a carriage associated with the calculating mechanisms for operating them properly to perform their respective functions.

Fig. 17 is a side elevation of said carriage, the supporting rails therefor being shown in section.

Fig. 18 is a cross-sectional view looking from the front to the rear showing yielding connections between the devices controlling the adding and subtracting operations of the machine.

Fig. 18a is a view of the same mechanism in yielded position.

Fig. 19 is a plan view of a portion of said devices in their normal or unoperated positions and with their connecting spring contracted.

Fig. 20 is a plan view of the same parts that are shown in Fig. 19, but in their operated positions and with their connecting spring extended.

Fig. 21 is a front elevation of a part of the mechanism, in its normal or unoperated position, controlled by the typewriter paper carriage for selecting the denominational orders through which the calculating mechanisms will be operated when the typewriter numeral keys are operated successively.

Fig. 22 is a view of the same mechanism in one of its selected denominational adjusted positions.

Fig. 23 is a view of the same mechanism in the highest denominational position to which it can be moved.

Fig. 24 is an enlarged front elevational view of a part of the mechanism for disconnecting the calculating machine entirely from the typewriting mechanism in order to permit operation of the typewriter numeral keys for any purpose desired without operating the calculating mechanism.

Fig. 25 is a plan view showing one specimen of the work performed by this machine.

Fig. 26 is a view showing an adjustable device in connection with the mechanism that establishes cooperation between the typewriter paper carriage and the entire calculating machine.

Fig. 27 is a plan view of the credit balance mechanism with the connections for operating the same.

Fig. 28 is a front elevation of one of the accumulating mechanisms.

Fig. 29 is a plan view thereof.

Fig. 30 is a vertical sectional view on the line 30—30 of Fig. 29.

Figure 1:
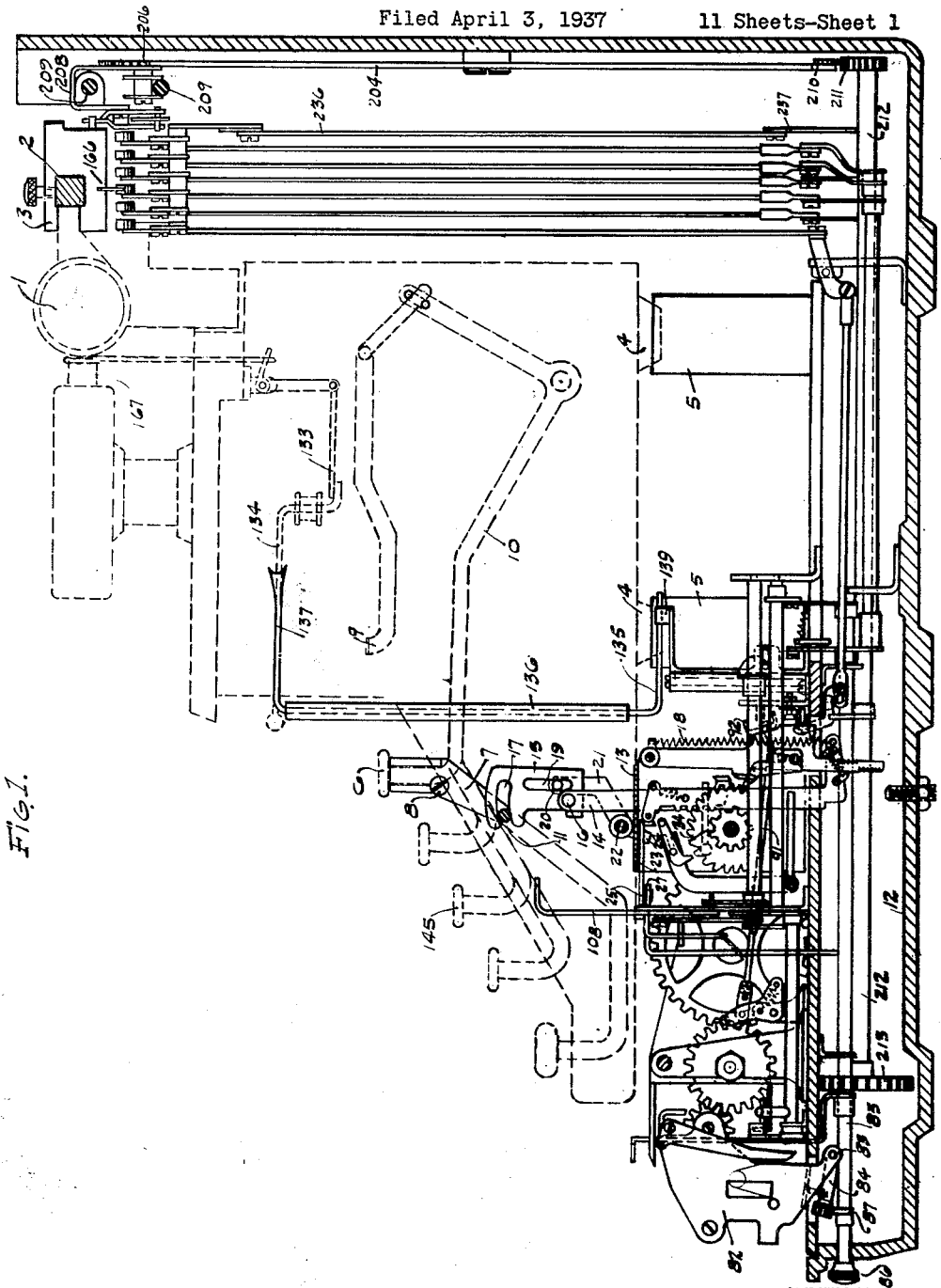
Fig. 1 is a vertical longitudinal sectional view of the invention applied to a familiar standard typewriting machine, some of the parts of which are indicated by broken lines.

The typewriting machine outlined by broken lines in Fig. 1 of the drawings is of a well known standard type including a laterally shiftable paper carriage 1. At the rear of this paper carriage I have mounted a bar 2 designed and adapted to support a number of cam blocks 3 in different selected adjustments or columnar positions having a desired relationship to the columnar positions to which the paper carriage is shifted during operation of the machine.

This standard typewriting machine is provided with the usual elastic supports 4 which, in the present instance, are utilized to engage in the upper ends of posts 5 provided for that purpose in the present invention. Thus, the standard typewriting machine is securely supported and held from undesired oscillation and vibration so as to cooperate with the present invention.

To each of the usual numeral keys 6 of this standard typewriting machine, I have rigidly attached a downwardly and forwardly extended arm 7 by means of a fastener 8. The usual numeral type bars 9 of this machine are pivotally connected with the key levers 10 of the numeral keys so that, when the numeral keys are depressed properly, the type bars will print on paper mounted in the paper carriage, all of which is familiar. Each of the arms 7 supports a laterally extended pin or lug 11.

The mechanism of the present invention is supported by a rigid base 12. A frame 13 is attached to the base 12 and supports for vertical sliding movements ten calculating slides 14. These slides extend through slots in the upper and lower portions of the frame 13 (Fig. 1), and are spaced apart in accordance with the lateral spacing of the numeral keys of the usual standard typewriting machine with which the invention is designed to cooperate. A coupling 15 is attached to the upper end of each slide 14 by a pivot 16, and each coupling has in its upper end an arcuate slot 17 arranged to receive the lug or pin 11 of the corresponding typewriter numeral key. The slides 14 are supported in their raised or upper positions by springs 18. The couplings 15 are also provided with slots 19, and a rod 20 extends horizontally through all of the slots 19. This rod is supported by a number of arms 21 attached to a rock shaft 22 supported for rocking movements by the frame 13.

It is now apparent that, when the shaft 22 is turned to the position shown in Fig. 1, the couplings 15 will be engaged with the pins or lugs 11; and that, when the shaft 22 is turned in a clockwise direction (Fig. 1), all of the couplings will be disengaged from the typewriter numeral keys.

A link 23 (Figs. 1 and 2) has pivotal engagement with a downwardly extended arm 24 rigid with one end of the shaft 22. The forward end of the link 23 has rigid therewith a pin 25 projecting downwardly into a cam slot 26 formed in the upper end of a lever 27 having its lower end pivotally supported by a rod 28. A link 29 has one end pivoted to the lever 27 and the opposite end pivoted to an upwardly extended arm 30 attached to the rear end of a rocking rod 31.

Figure 2:
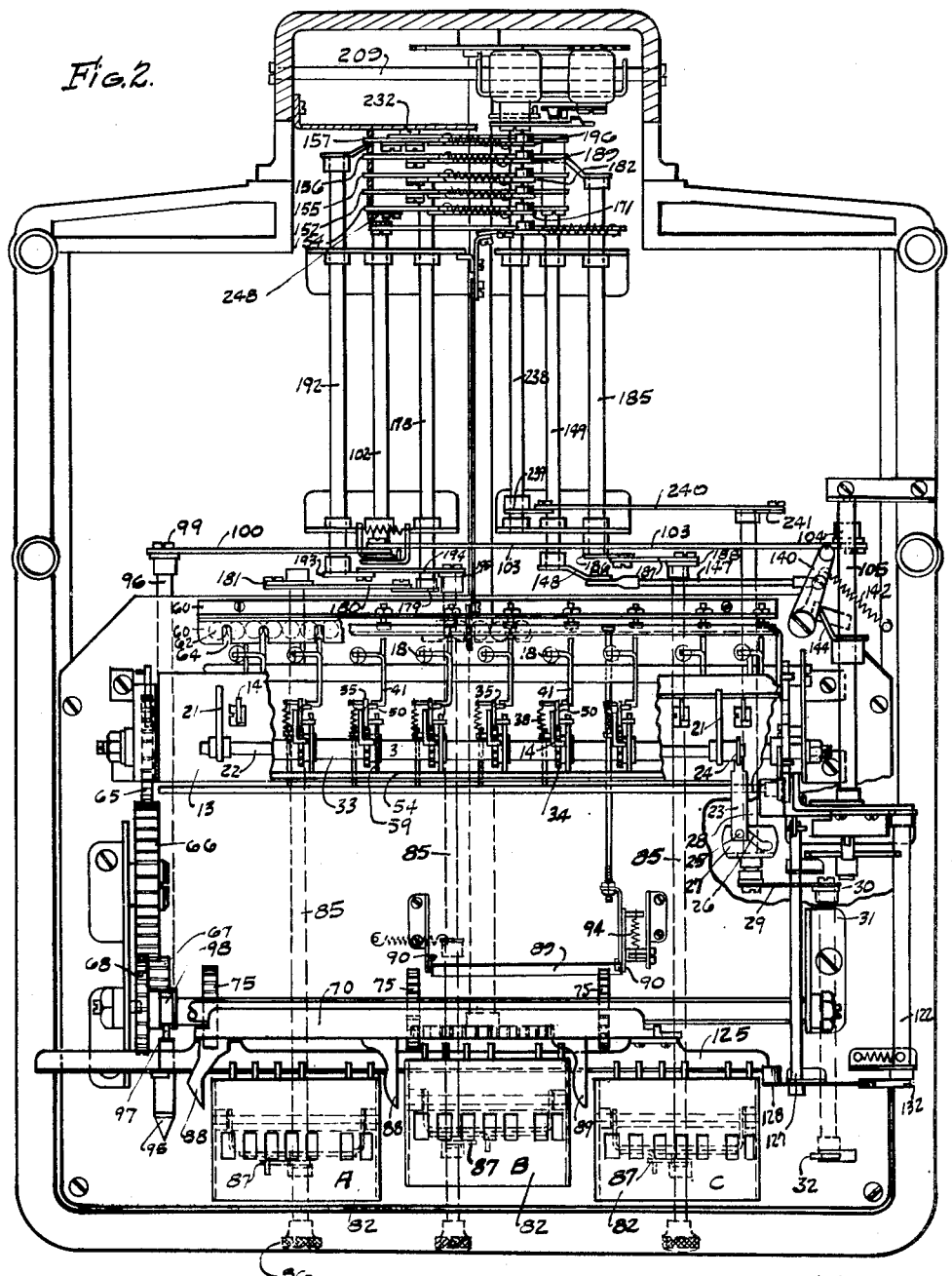
Fig. 2 is a plan view of the present invention apart from the typewriting machine for which it is intended, a few of the parts being broken away.

A lever 32 is attached to the upper end of the rod 31 and extends upwardly in front of the base of the typewriting machine. When the lever 32 is swung toward the left, as shown in Fig. 2, the cam 26 rocks the shaft 22 and swings the couplings 15 rearwardly out of engagement with the pins or lugs 11 attached to the typewriter numeral keys; and, when the lever 32 is swung toward the right from the position in which it is shown in Fig. 2, the couplings 15 are swung upwardly and are engaged with all of the pins or lugs 11. Any conventional latch device or detent may be provided to engage with and hold the lever 32 in its two positions.

A rotary shaft 33 is supported by the frame 13, and has attached thereto nine pinions 34 adjacent to the respective slides 14 corresponding to the nine digits from "1" to "9," inclusive. No pinion is provided for the "0" key. Each slide 14 supports a rack 35. These racks have on their upper ends forward extensions 36 which are mounted on pivots 37 attached to the respective slides 14. The number of teeth on the respective racks differ, there being one tooth only on the rack corresponding to the typewriter key for the digit "1," two teeth on the rack corresponding to the typewriter key for the digit "2," and so on, there being nine teeth on the rack corresponding to the typewriter numeral key for the digit "9." These racks 35 are actuated to and yieldingly held in their forward positions by springs 38 having their upper ends connected with pins 39 projecting from the upper ends of the racks and their lower ends attched to the slides 14 (Figs. 4, 5 and 6). The shaft 33 is in front of and adjacent to the key connections 14. When the slides 14 are in their raised positions, the racks 35 are out of mesh with the pinions 34. When the couplings 15 are connected with the typewriter numeral keys and any numeral key is depressed, it will push downwardly the corresponding slide 14 and will engage its rack 35 with the corresponding pinion 34 and rotate the same, and thereby the shaft 33, a distance corresponding to the number of teeth on the rack 35. Since the typewriter numeral keys are depressed equal distances, it is necessary to make provision for rotation of the corresponding pinions 34 distances corresponding to the values of the digits on the respective keys. Because the pinions 34 are of equal diameter (Fig. 2), the number of teeth on the racks 35 are made to correspond to the digital value of the respective keys by which the racks are to be operated. Each rack has thereon a lateral projection 40 engaging the rear edge of the slide 14 by which it is supported in order to limit extent of movement of the racks by the springs 38.

For each slide 14 a combined full stroke and key locking device is provided in order to require full and complete depression of each typewriter numeral key before said key can return to its normal or unoperated position after it has been started in operation, and to prevent any typewriter numeral key from being operated when any other numeral key is in operation and is out of its normal or unoperated position. Each of said devices comprises a swinging support 41, all of which pivotally depend from a rod 42 rearwardly from the slides 14. The springs 18 for the respective slides 14 have their upper ends connected with extensions 43 from the respective supports 41. Therefore, these springs 18 function to support the slides 14 yieldingly in their raised positions, to return them to their raised positions after they have been depressed, and to swing the lower ends of the supports 41 forwardly toward the slides 14. The lower end of each slide 14 supports two pawls 44 and 45 designed and adapted to engage respectively with ratchet teeth 46 and 47. The lower ends of the supports 41 extend between the pawls 44 and 45. When the machine is idle, these parts occupy the positions shown in Fig. 4 of the drawings, the pawls 44 and 45 being actuated toward the support 41 by connecting springs 48. Movement of the pawls 44 and 45 toward each other is limited by studs 49 attached to the lower ends of the respective slides 14.

Before any typewriter numeral key can be depressed far enough to engage its rack 35 with the corresponding pinion 34, it is necessary to swing the lower end of the support 41 rearwardly so that the pawl 44 will not engage with the ratchet teeth 46. This is effected by cams 50 on the lower ends of the racks 35 operating against cams 51 on the forward edges of the supports 41. When any cam 50 engages and operates against the corresponding cam 51, it will swing the lower end of the support 41 rearwardly far enough to prevent the pawl 44 from engaging with the ratchet teeth 46, as clearly shown in Fig. 5. The stud 49 prevents the pawl 44 from engaging the ratchet teeth 46. However, when the support 41 is swung rearwardly as described, the pawl 45 engages the ratchet teeth 47, thereby making it impossible for the typewriter numeral key and the slide 14 with which it is coupled to return to their idle positions until the typewriter key has been completely depressed.

A lateral projection 52 is formed on the cam 50 and a flange 53 is formed on the cam 51. About the time that the numeral key reaches the limit of its downward stroke, the cam 50 passes beyond the cam 51 and the spring 18 immediately swings forwardly the lower end of the support 41, thereby disengaging the ratchet teeth 47 from the pawl 45 and engaging the ratchet teeth 46 with the pawl 44. It is now necessary to disengage the rack 35 of the depressed typewriter numeral key from the pinion 34 in order to permit said depressed typewriter numeral key and its rack 35 to rise to their idle or unoperated positions without turning the pinion 34 or the shaft 33.

A rod 54 is supported by the frame 13 for rocking movements. A lever is attached to said rod 54 and comprises an arm 55 and another arm 56. This rod 54 is located in front of the slide 14 and, in its idle or unoperated position (Figs. 4 and 5) to which it is moved and in which it is yieldingly supported by a spring 57 (Fig. 6), the arm 56 abuts against a depending portion 58 of the frame 13. A series of arms 59 are attached to the rod 54 and project rearwardly therefrom adjacent to the respective slide 14 and below the pins 39 that are attached to and project laterally from the upper ends of the racks. 35. When any typewriter numeral key and its coupled slide 14 are pushed downwardly, the pin 39 engages the adjacent arm 59 and pushes downwardly said arm 59, thereby turning the shaft 54 in opposition to the spring 57, which is stronger than the spring 38. Because of the fact that the cam 50 is in engagement with the cam 51 during downward movement of the typewriter numeral key, it is impossible for the rack 35 to be moved out of engagement with the pinion 34, notwithstanding that the spring 57 is stronger than the spring 38. When the cam 50 passes beyond the flange 53, the spring 57 overcomes the spring 38 and swings the rack 35 rearwardly from the position shown in Fig. 5 to the position shown in Fig. 6, so that the projection 52 is behind the flange 53. At this time, there is nothing to prevent the typewriter key from being returned to its idle or unoperated position, nor to prevent the spring 18 from cooperating therewith to return the slide 14 to its idle position. This is because the pawl 44 will escape along the ratchet teeth 46 while the pawl 45 is held out of engagement with the ratchet teeth 47 by the pin 49.

From the foregoing, it should now be apparent that each typewriter numeral key and its connections must be operated to the full extent of a complete stroke at each operation. Otherwise, it is impossible for any typewriter numeral key to return to its idle or unoperated position.

The supports 41 also cooperate to prevent simultaneous operation of two or more typewriter numeral keys and their connections. A channel element 60 is supported by a part 61 of the rigid frame 13 and supports a plurality of discs 62 capable of only limited lateral movement. A projecting part 63 on each support 41 (Figs. 4, 5 and 6) extends into a slot 64 in the channel element 60 and between the forward portions of two adjacent discs 62. When all of the supports 41 are in their forward or idle positions, there is nothing to prevent depression of any typewriter numeral key. But, when any typewriter numeral key is depressed and the corresponding support 41 is moved rearwardly by the cams 50 and 51, the projecting part 63 of said support 41 is forced rearwardly between the two adjacent cooperating discs 62 and thereby moves the discs on one side of the projection 63 in one direction and the discs on the opposite side of said projection 63 in the opposite direction. Because of the fact that the discs 62 are capable only of this limited movement, it is now impossible to depress two or more typewriter numeral keys simultaneously. But, when the cam 50 passes below the cam 51 and the support 41 is swung forwardly, the function of that numeral key that had been operated has been completed, and it is now possible to operate any other typewriter numeral key even while the one that had been previously operated is returning to its idle or unoperated position. This contributes substantially to the speed of operation of this machine without any sacrifice of efficiency.

When the shaft 33 is rotated by the numeral keys as described, it operates a train of gearing controlling the calculating mechanisms. A gear wheel 65 (Fig. 2) is attached to and rotated by the shaft 33 and is in constant mesh with a gear wheel 66. The gear wheel 66 is in constant mesh with a pinion 67. A pinion 68 is mounted for sliding movements along a rotary shaft 69 which, as shown, is angular in cross-section so that, when said pinion 68 is rotated, the shaft 69 will be rotated thereby. A carriage 70 is mounted for sliding movements along the shaft 69 and along another shaft 71, and has a roller 72 operating along a rail 73. The shafts 69 and 71 and the roller 72 and rail 73 cooperate to support and guide the carriage 70 and to prevent undesired vibration or oscillation thereof during its lateral shifting movements. A tubular shaft 74 is mounted in the carriage 70 and is splined upon the shaft 69 for sliding movements along said shaft 69 and for rotation thereby, and has attached thereto a number of pinions 75 for operating the respective calculating mechanisms, certain of which are movable into and out of position to cooperate with and be operated by the respective pinions 75. It is now clear that, when any typewriter numeral key is operated, all of the pinions 75 will be rotated a distance corresponding to the digital value of the typewriter numeral key that had been operated.

As shown in Fig. 2, the machine is equipped with three separate and independently and selectively operative calculating mechanisms which are duplicates of each other, and a description of one will be sufficient.

Each calculating mechanism comprises a series of pinions 76 rotatively mounted on a shaft 77 and attached to dials 78, each having the ten digits displayed on its periphery. These calculating pinions are associated with transfer devices 79 for transferring from lower to higher denominational orders and operating in a known manner. Pinions 80 rotatively mounted on a shaft 81 mesh with the respective pinions 76, and the pinions 75 are moved laterally into engagement with the respective pinions 80 automatically and as an incident to operation of the typewriter keys and the lateral movement of the typewriter paper carriage 1.

Each calculating mechanism is supported in a frame 82, and each of said frames is supported upon an independently rockable shaft 83 (Fig. 1). An arm 84 is attached to each rod 83 and extends forwardly therefrom. For each calculating mechanism, a rotary shaft 85 is supported by the base of the machine, and said shafts 85 have attached to their forward ends beyond the base of the machine manually engageable knobs or handles 86 whereby said shafts may be rotated. A cam 87 is attached to each shaft 85 and engages the forward end of the corresponding arm 84 so that, when the shaft is rotated a proper distance, it will move the frame 82 supporting the corresponding calculating device to position in which the pinions 75 may successively engage the pinions 80 to operate the calculating device when the typewriter numeral keys are operated. The carriage 70 is operated from higher to lower denominational orders to introduce into one or more of the calculating mechanisms the digits in accordance with the normal operation of the typewriter numeral keys which are operated from higher to lower denominational orders in typing numbers or items of account on the paper in the paper carriage.

The carriage 70 supports a pointer 88 for each calculating device which indicates the denominational order position in which the carriage 70 is located, and thereby informs the operator as to whether or not the carriage 70 is shifting properly from order to order when the typewriter numeral keys are operated.

After any typewriter numeral key is operated, all of the pinions 75 are accurately centered and held against accidental rotation. A small rod 89 is supported for swinging movements by arms 90 one of which has link connection 91 (Fig. 1) with a bail 92 (Figs. 1 and 4) mounted on swinging supports 93. The bail 92 extends transversely of the machine in contact with the extensions 63 of the swinging supports 41 so that, when any typewriter numeral key is depressed, the bail 92 will be moved rearwardly and will thereby move rearwardly the link 91 and the rod 89 a sufficient distance to disengage the rod 89 from any pinion 75 with which it had been engaged. A spring 94 (Fig. 2) is provided to move forwardly the link 91, and thereby the rod 89, when the swinging support 41 moves forwardly. This forward movement of the rod 89 engages the same with one or the other of the pinions 75, depending upon the position of the carriage 70. The rod 89 is effective to prevent accidental rotative displacement of the pinions 75 and to center them and hold them in position for proper meshing engagement with the pinions 80 of the calculating mechanism.

When the pinion 68 is in direct mesh with and is rotated by the gear wheel 66, the selected calculating mechanism or mechanisms will be operated in direct addition. When said pinion 68 is in direct mesh with the gear wheel 66, it is out of engagement with the pinion 67; and, when the pinion 68 is shifted laterally, toward the right as shown in Fig. 2, to a position in which it is out of mesh with the gear wheel 66, it is in mesh with the pinion 67, so that, when the typewriter numeral keys are operated, the pinions 75 will be rotated in the direction opposite from that in which they are rotated when the pinion 68 is in mesh with and is operated directly by the gear wheel 66. Consequently, the pinions 76 of the calculating mechanisms will be rotated in the reverse direction from that in which they are rotated in the performance of examples of direct addition and will be caused to operate in subtraction.

An indicating arm 95 (Figs. 2 and 3) has its lower end attached to the forward end of a rockable rod 96 and has a pin 97 engaging in a circumferential groove 98 in the hub of the pinion 68. Therefore, when the pinion 68 is shifted to its different adjusted positions along the shaft 69, the indicator 95 will be moved to different positions. The upper end of the indicator 95 is visible and indicates to the operator the fact of whether the pinion 68 is in position for operation in examples of direct addition or in examples of subtraction. The rear end of the rod 96 has an upwardly extended arm 99 to which one end of a link 100 is pivoted, the opposite end of said link being pivoted to an upwardly extended arm 101 attached to a rod 102 supported for rocking movements near the base of the machine. A link 103 has its inner end pivoted to the arm 101 and its outer end pivoted to an upwardly extended arm 104 attached to the rear end of a rockable rod 105. The forward end of the rod 105 has attached thereto a lever 106 provided with an upwardly extending cam 107 immediately above the rod 105. A credit balance key 108 is mounted for vertical sliding movements on a rigid support 109 (Figs. 11 and 12), being guided by pin and slot construction 110, and is yieldingly supported in its raised position, and returned to its raised position after operation, by a spring 111. Said key supports a pivot 112 on which an actuator 113 is mounted for lateral swinging movements. Said actuator has therein an arcuate slot 114 which is concentric with the axis of the pivot 112, and a headed pin 115 extends through said slot and is attached to the key 108. A pin 116 projecting from the actuator 113 operates in a slot 117 formed in a bracket 118 rigidly attached to the support 109. The slot 117 tapers upwardly so that, when the key 108 rises, the pin 116 will move along the walls of the slot 117 and thereby center the actuator 113 and prevent oscillation thereof. When the credit balance key 108 is depressed, a pin 119 projecting forwardly from the lower end of the actuator 113 engages and moves along one side or the other of the cam 107, and the actuator is thereby swung laterally to one side or the other of the rod 105 and, by continued downward movement, moves laterally along one end or the other of the lever 106 and operates the same to rock the rod 105; and, through the connections described, moves the pinion 68 from engagement with the gear wheel 66 to engagement with the pinion 67, and vice versa, depending upon the direction in which the rod 105 is rocked.

When the parts are in the positions shown in Fig. 11, depression of the credit balance key 108 will cause the pin 119 to engage the cam 107 and be moved laterally toward the left along and against the lever 106 and will turn the rod 105 from the position shown in Fig. 11 to the position shown in Fig. 13, which shifts the pinion 68 out of engagement with the gear wheel 66 into engagement with the pinion 67 preparatory for operation of the selected calculating mechanism in a subtracting or credit balance operation. The lever 106 and its connections to the pinion 68 may be held in their two adjusted positions by any appropriate or known type of detent or latch device.

When the key 108 is depressed, the pivoted pawl 120 engages in a ratchet 121 formed in the edge of the key 108 and holds the key 108 in its depressed position until the intended item is completely entered as a credit balance item. The pawl 120 is attached to a rockable rod 122, the forward end of which has an upwardly extended pin 123 attached thereto. This pin 123 is connected with the base of the machine by a spring 124 which actuates the pawl 120 into latching engagement with the key 108. The carriage 70 has an extended part 125 which pushes against the upwardly extended pin 123 and thereby rocks the rod 122 after the units digit of the credit balance item has been entered. The rod 122 is thereby turned in a direction and far enough to disengage the pawl 120 from the credit balance key 108. Thereupon, the credit balance key is raised to its idle position by the spring 111. This leaves the lever 106 in the position shown in Fig. 13. When the lever 108 is again depressed, the pin 119 will operate on the opposite side of the cam 107 and on the end of the lever 106 that is toward the right (Fig. 13), and will thereby turn the rod 105 in a clockwise direction and shift the pinion 68 out of engagement with the pinion 67 and into engagement with the gear wheel 66.

The credit balance key 108 is locked against operation until the carriage 70 is moved to proper position for entry of a credit balance item. An arm 126 is attached to the rear end of a rockable rod 127. A lever 128 is attached to the forward end of said rod and is actuated by a spring 129 to a position in which the upper end of the arm 126 is immediately under a pin 130 projecting from the key 108, thereby making it impossible to depress the key 108 until the arm 126 is moved out of line with said pin 130. A roller 131 is supported by the inner end of the lever 128. When the carriage 70 is moved to position for entry of a credit balance item, the extension 125 moves under the roller 131 and operates the lever 128 in a direction and far enough to swing the arm 126 out of line with the pin 130. It is now possible to depress the key 108.

The outer end of the lever 128 extends under an arm 132 attached to the forward end of the rod 122. When the carriage 70 is moved to its idle or unoperated position at the extreme left of the machine, the extension 125 passes beyond and out of engagement with the roller 131 and the spring 129 then operates the lever 128 to a position in which the arm 126 is again under and in line with the pin 130 to lock the credit balance key 108 against operation. This movement of the lever 128 also turns the rod 122 far enough to disengage the pawl 120 from the credit balance key, whereupon the spring 111 raises the credit balance key to its idle or unoperated position.

Some or all standard typewriting machines on the market and in use at the present time are equipped to use bichrome ribbons having one strip of dark color and another strip of contrasting color, usually red. It is a familiar fact that these ribbons are usually or always arranged so that the dark strip is along the upper margins of the ribbons and the red strip is along the lower margins. The standard typewriting machines are equipped with ribbon-shifting connections 133 of a familiar type, shown conventionally in Fig. 1 and including an actuating element 134. The actuating element 134, as is known, is usually manually shiftable. In the present invention, I have embodied mechanism operated by or under control of the credit balance key 108 for operating the actuating element 134 and the ribbon-shifting connections 133 to shift the ribbon to position in which the red margin is along the printing line. This mechanism comprises a rod 135 mounted for turning movements in a supporting tube 136 which I attach to the usual standard typewriting machine that is to be used. The upper end of the rod 135 has an arm 137 attached to the actuating element 134 so that, when the rod 135 is turned in one direction, the actuating element 134 and the usual ribbon-shifting connections 133 will be operated to move the ribbon to a position in which the red margin of the ribbon is at the printing line; and, when said rod is turned in the opposite direction, the ribbon will be shifted to a position in which the dark margin is at the printing line. The lower end of the rod 135 has an angular arm 138 (Fig. 1) which extends across a roller 139 supported on a lever 140 mounted on a pivot 141 and actuated to its idle position by a spring 142 (Figs. 2 and 27). The lever 140 has a projection 143 extending adjacent to a cam 144 attached to the rod 105'. Therefore, when the rod 105' is turned in a counter-clockwise direction from the position shown in Fig. 11, the cam 144 will operate against the projection 143 and move the lever 140 in opposition to the spring 142 and thereby turn the rod 135 in a direction and far enough to operate the actuator 134, and thereby the ribbon-shifting connections 133, to move the ribbon to a position in which the red margin is at the printing line. When the credit balance key 108 is depressed, the ribbon is thereby shifted to a position in which the red margin is at the printing line so that the credit balance items will be printed in red when the typewriter numeral keys are operated to record said credit balance items and enter them in the calculating mechanism of the machine. In addition, the present invention includes connections operated by or under control of the typewriter paper carriage for shifting the ribbon to present the red margin at the printing line independently of the credit balance key 108. The rod 105' is turned by a pin 108' on the key 108 engaging in a slot in an arm X attached to said rod 105.

Many or all typewriting machines are equipped with special keys, apart from the usual letter and digit keys, for printing special abbreviations, characters or designations. According to the present invention, the typewriter key 145 bears the designations "CR," or some other selected designation, and is connected up with a type bar to be operated thereby and bearing a corresponding designation. The remaining keys of the typewriting machine, as is known, shift the ribbon from the position below and exposing the printing line to a position at the printing line to receive the blows of the type bars 9. It is a familiar fact that, after each type bar is operated, the ribbon is shifted downwardly to expose the printing line, and that the paper carriage is thereafter shifted laterally one letter space. I modify the usual typewriting machine by removing the usual connection from the key 145 to the ribbon-shifting mechanism and by disconnecting said key 145 from the usual escapement mechanism so that, when the key 145 is operated, the corresponding type bar will be operated thereby without moving the ribbon to the printing line and without operating the paper carriage escapement mechanism, so that the platen remains stationary. Thus, the type bar connected with the key 145 will be operated thereby to strike the paper on the paper carriage, but the ribbon will remain below the printing line and will not be struck by the type bar; and, since the key 145 is wholly incapable of operating the usual paper carriage escapement mechanism, the paper carriage will not be shifted. However, the credit balance item can then be printed after the notation "CR" without blurring. This is because I further modify the standard typewriting machine by extending to the left an appropriate distance the type bar that is operated by the key 145 far enough to permit said type bar to strike the paper and thereby cause the carbon to record upon the manifold sheets the notation "CR" without printing the same upon the first or original record sheet. This is to say that, when the key 145 is operated, the corresponding type bar does not strike the ribbon but strikes the original record sheet in the machine and prints upon all of the manifold sheets the notation "CR." These parts which I remove or omit from the standard typewriting machine are not shown in the drawings because they are not present, and their removal can be effected by any skilled typewriter mechanic without affecting the remaining mechanism. Therefore, the record produced upon the manifold sheets, one of which is shown in Fig. 25, will include the designation "CR" indicated at 146, but this designation will not be recorded upon the orginal or ribbon copy of the record. When the key 108 is depressed by the key 145, it is latched in its depressed position by the pawl 120 and released in the manner heretofore described.

The lever 140, which shifts the red strand of the ribbon to the printing line upon depression of the credit balance key 108 as described, may also be operated by the paper carriage 1 of the typewriting machine while said key 108 remains unoperated in its idle position. A link 147 has one end pivotally connected with the lever 140 (Fig. 27) and the opposite end pivotally connected with an arm 148 attached to the forward end of a rockable rod 149. The rear end of said rod 149 has attached thereto an arm 150 to which the lower end of a link 151 is pivoted, the upper end of said link being pivoted to one end of a lever 152 mounted on a pivot 153. The form of the lever 152 may be understood by reference to Figs. 3a and 3b, which illustrate a lever 154 controlling one of the accumulating mechanisms in a manner hereinafter described. There are three additional levers 155, 156 and 157 of precisely the same form as the levers 152 and 154, and all are mounted on the pivot 153. Each of these five levers supports a sliding angular bracket 158. Each bracket has in one end thereof a straight slot 159 and, in the opposite end thereof, an angular slot 160. A supporting screw 161 extends through the slot 159 into the corresponding lever, and a supporting screw 162 extends through the angular slot 160 and into said lever. A spring 163 connects the upwardly extended arm of each bracket 158 with its supporting lever and yieldingly holds the bracket in its uppermost position in which the screw 162 is in the lower part of the slot 160. However, the spring 163 will yield to permit sliding movement of the bracket toward the pivot 153 and permit the upwardly extended arm of said bracket to be pushed downwardly. A roller 164 is supported by the upwardly extended arm of each of the brackets 158.

The cam block 3 that operates the ribbon-shifting connections described is shown in Fig. 1 and has in its lower edge a series of grooves 165. The remaining cam blocks 3 which are behind that cam block shown in Fig. 1 have the same number of slots. A cam 166 is attached in any of the grooves 165 and projects downwardly so that, when the paper carriage 1 is moved laterally to the columnar position for entering a credit balance item, the cam 166 will engage the roller 164 and push downwardly the lever 154 that is connected with the ribbon-shifting link 151. The ribbon-shifting connections are thereby operated to raise the ribbon 167 to a position in which the red strand is along the printing line. The ribbon will be held in that position until record of the notation or item to be printed in red is completed. When the carriage 1 is moved further toward the left after the record entry has been completed, the cam 166 passes beyond and out of engagement with the roller 164, whereupon a spring 168 (Fig. 2) operates to restore the ribbon-shifting connections to their idle or unoperated positions and the ribbon-shifting connections 133 move the ribbon 167 downwardly below the printing line. Thus, the paper carriage 1 can be utilized to shift the ribbon to hold the red strand thereof along the printing line, irrespective of whether a credit balance item is being recorded or some other notation or item. The credit balance key 108 is operative to cause an item to be printed in red in any of the columnar positions of the paper carriage, and the cam block 3 can be set in any selected position on the bar 2 to cause an item to be printed in red in any selected columnar position of the paper carriage independently of the credit balance key.

As stated, when the cam 166 passes beyond and out of engagement with the roller 164, the lever 152 rises. Thereafter, when the paper carriage is again shifted toward the right, the cam 166 will engage the roller 164 and push the bracket 158 from the position shown in Fig. 3a to the position shown in Fig. 3b without operating the lever 152.

The rear end of the rod 102 has attached thereto an arm 169 (Fig. 31), which is connected by a link 170 with the lever 154 having thereon a bracket 171 precisely like the bracket 158 and similarly mounted and arranged and supporting a roller like the roller 164. One of the cam blocks 3 with its cam 166 will operate against the roller on the bracket 171 when the paper carriage is moved to a columnar position in which a negative item is to be entered for subtraction. During the entry of the item to be subtracted, the lever 154 is held depressed by a cam 166. When the lever 154 is pushed downwardly, the link 170 rocks the rod 102 which operates the device 95 to shift the pinion 68 out of engagement with the gear 66 and into engagement with the pinion 67. Then, when the typewriter digit keys are operated, the negative item will be introduced into the selected accumulating mechanism either as a negative total or by subtracting the same from another total contained or represented in that selected accumulating mechanism. When the paper carriage 1 carries the effective cam 166 beyond the roller carried by the lever 154, the lever will be returned to its raised position, thereby permitting a spring 172 to operate the connections and shift the pinion 68 from engagement with the pinion 67 into engagement with the gear 66 (Fig. 3). When the carriage is again moved toward the right, the complementary cam 166 will push the bracket 171 to the position shown in Fig. 3b without depression of the lever 154.

The arm 101 is pivoted on the rod 102 and has an angular extension 173 (Fig. 27) connected by a spring 174 with an angular arm 175 that is attached to said rod 102. Therefore, the rod 102 does not positively operate the arm 101 because of this yielding connection. These devices permit the credit balance key to operate the connections therefrom to the arm 101 and to operate said arm and the connections therefrom to the pinion 68 to shift said pinion out of engagement with the pinion 67 and into engagement with the gear 66, even if the lever 154 is held down by the complementary cam 166.

For convenience, I have designated the three accumulators A, B and C, respectively (Fig. 2). As before explained, each accumulator frame 82 is mounted on a rockable rod 83 for swinging movements into and out of position for operation by the respective pinions 75. In the forward positions, the pinions 80 thereof cannot be engaged by the pinions 75. In order to operate any selected accumulator, it is necessary to swing the same rearwardly to position in which its pinions 80 will be engaged by the corresponding pinion 75. As before explained, the rods 85 may be operated manually to swing the accumulators to position for operation. Additionally, the respective rods 85 may be operated by the paper carriage 1.

The lever 155 is connected by a link 176 with an arm 177 attached to the rear end of a rockable rod 178 having on its front end an arm 179 connected by a link 180 with an arm 181 on the rear end of the rod 85 that moves the accumulator A. The lever 155 supports a bracket 182, constructed and mounted precisely the same as the brackets 158 and 171, and having thereon a roller like the roller 164 to be engaged and operated by a complementary cam 166. When the lever 155 is pushed downwardly by its complementary cam, the connections therefrom to the rod 85 turn said rod and cause the cam 87 to swing the accumulator A rearwardly so that its pinions 80 may be successively engaged and operated by the complementary pinion 75, either in addition or subtraction.

The lever 156 is connected by a link 183 with an arm 184 attached to the rear end of a rod 185 having attached to its forward end an arm 186 connected by a link 187 with an arm 188 attached to the rear end of the rod 85 that shifts the accumulator C. The lever 155 supports a bracket 189, constructed and mounted exactly the same as the brackets 158, 171 and 182, and having thereon a roller like the roller 164 to be engaged and operated by a complementary cam 166. When the lever 155 is pushed downwardly by its complementary cam, the connections therefrom to the rod 85 turn said rod and cause the cam 87 to swing the accumulator C rearwardly so that its pinions 80 may be successively engaged and operated by the complementary pinion 75, either in addition or subtraction.

The lever 157 is connected by a link 190 with an arm 191 rigidly attached to a rockable rod 192. The forward end of the rod 192 is rigidly attached to an arm 193 which is connected by a link 194 with an arm 195 rigidly attached to the rear end of the rod 85 that shifts the accumulator B. The lever 155 supports a bracket 196, constructed and mounted exactly the same as the brackets 158, 171, 182 and 189, and having thereon a roller like the roller 164 to be engaged and operated by a complementary cam 166. When the lever 155 is pushed downwardly by its complementary cam, the connections therefrom to the rod 85 turn said rod and cause the cam 87 to swing the accumulator B rearwardly so that its pinions 80 may be successively engaged and operated by the complementary pinion 75, either in addition or subtraction.

When the paper carriage carries the respective cams 166 beyond rollers on the brackets 182, 189 and 196, the springs 197 connecting the respective cams 87 with the base of the machine swing said cams downwardly and permit the respective accumulators A, B and C to swing forwardly to position in which the pinions 80 thereof cannot be engaged by the complementary pinions 75.

Obviously, the specific arrangement of the connections for shifting the accumulators to and from operative position may be varied, and any of said accumulators may be kept in operative position in various columnar positions of the paper carriage and shifted out of operative position in other selected columnar positions of the paper carriage.

The machine as illustrated comprises means preventing operation of either of the accumulator brackets 182, 189 or 196 by the complementary cams 166, irrespective of the movement or position of the paper carriage 1. As already explained, each rod 185 is equipped on its forward exposed end with a knob or handle 86 which are manually engageable to turn the rods 85 selectively. Each link 176, 183 and 190 is connected with its lever 155, 156 and 157 by an elastic coupling. Each coupling comprises a plate 198 pivoted to the lever 155, 156 or 157 (Fig. 3a) and having therein an elongated slot 199. Headed pins or rivets 200 are attached to cam members 201 and extend through the slots 199 and thereby couple together the parts 198 and 201 for relative sliding movements. A spring 202 connects each coupling member 201 with its plate 198, and the tendency of said springs is to move the parts 201 downwardly. The springs 202 constitute resilient means for operating the links 176 by the plates 198, but yield to permit positive movement of the parts 201 with respect to the plates 198. A cam 203 is formed on the upper portion of each member 201, and these cams are adjacent to the ends of the respective brackets 182, 189 and 190, so that, when the cams 203 are pushed upwardly, they will push the respective brackets to the right and permit the screws 162 to enter the upwardly extended portions of the slots 160 and thereby prevent effective operation of said brackets by their complementary cams 166. Turning of the rods 85 in the proper direction will actuate the connections therefrom to move upwardly the links 176, 183 and 190 and thereby move upwardly the cams 203. Such upward movement of the cams 203 disables the brackets 158. Moreover, this turning of the rods 85 operates the cams 87 to release the arms 84 and permit the corresponding accumulators A, B and C to swing forwardly to positions in which their pinions 80 cannot be engaged by the pinions 75.

A lever 204 is mounted on a pivot 205 at the rear of the machine. An arcuate rack 206 is formed on the upper end of the lever 204 and meshes with a complementary rack 207 mounted in a carriage 208. The carriage 208 is mounted for horizontal reciprocating movements on rails 209 (Figs. 1 and 3). When the carriage is moved along the rails 209, it will oscillate the lever 204. The lower end of the lever 204 is attached to an arcuate rack 210 which meshes with a pinion 211 attached to a rotary shaft 212 supported near the base of the machine and extending forwardly. A gear wheel 213 is attached to the forward end of the shaft 212 and meshes with a rack 214 attached to the carriage 70. Thus, the carriage 208 constitutes means for operating the connections leading to the carriage 70 for shifting said carriage 70 laterally to different denominational order positions. This means that, by operation of the carriage 208, the carriage 70 can be operated to locate the pinions 75 in different denominational order positions with respect to their associated calculating mechanisms A, B and C. Thus, by movement of the carriage 208 to one definite position, all of the pinions 75 will be located so as to operate the associated units calculating pinions; by moving the carriage 208 to another definite position, the pinions 75 will be located in tens denominational order for operating the tens pinions; and, by moving the carriage 208 to other selected positions, the pinions 75 will be located in corresponding denominational orders preparatory for operation of the corresponding calculating pinions.

The carriage 208 is operated by the typewriter paper carriage 1 which supports in adjusted positions on the bar 2 the required number of cam blocks 3 which may be mounted in selected adjusted positions on said bar 2. Each cam block 3 has a rearwardly extended cam arm 216. The carriage 208 supports a detent comprising an arm 217, a downwardly extended arm 218 and an upwardly extended shoulder 219. The carriage 208 also supports another detent comprising an arm 220, a downwardly extended arm 221 and an upwardly extended shoulder 222. The arms 218 and 221 are connected by a spring 223. The cam arm 218 cooperates with the shoulders 219 and 222 to shift the carriage 208 along the rails 209 and thereby operate the carriage 70.

In the idle or unoperated position of the carriage 208, the arm 221 is in engagement with a rigidly supported pin 224. This holds the detent arm 220 in a downward position (Fig. 3) so that the shoulder 222 is below the lower edge of the cam arm 216 and cannot be engaged thereby when the paper carriage 1 moves toward the left in tabulating or letter-spacing movements. However, the shoulder 219 will be engaged by the cam arm 216, and continued movement of the paper carriage 1 toward the left in letter-spacing or in tabulating movements will move the carriage 208 along with it until the arm 218 strikes against the pin 224. When the arm 218 strikes against the pin 224, the shoulder 219 will be moved downwardly out of engagement with the cam arm 216, at which time the carriage 208 is released and can return to its idle or unoperated position. For operating the lever 204 to return the carriage 208 to its idle or unoperated position after it has been released from the cam arm 216, a spring 225 is provided and has one end attached to a stationary part of the machine and its opposite end attached to an arm 226 connected with the lever 204 (Fig. 26).

As shown, the left-hand edge of the shoulder 219 is beveled or inclined and the right-hand edge of the cam arm 216 is beveled or inclined. Because of these beveled surfaces, the paper carriage 1 of the typewriting machine can be moved to the right to any desired position because the cam arms 216 will escape over the shoulder 219 without objectionable resistance, the spring 223 yielding to permit such escapement.

In order to facilitate proper and accurate assembly so that the gear wheel 213 will be in precisely accurate and proper mesh with the rack 214, the lever 204 is made in two parts which are relatively adjustable, and both of said parts are mounted on the pivot 205. The upper part D supports the rack 206, and the lower part E supports the rack 210. These levers overlap and are attached together by screw and slot devices 227. A lug 228 is attached to the lower end of the lever part D below the pivot 205 and the lever part E has a pair of ears 229 through which set screws 230 extend into engagement with the opposite sides of the lug 228 to hold the lever members D and E in rigid relationship. These lever parts D and E may be adjusted relatively by loosening one of the screws 230 and then tightening the other to force the lug 228 against the end of the screw that has been loosened. The screw and slot connections 227 permit this adjusting movement of the lever members D and E by the screws 230 and cooperate with said screws 230 to hold the lever parts properly adjusted.

The support 231 to which the pivot 153 is attached is mounted on a pivot 232. A pivot 233 supports a lever 234 which has pin and slot connection 235 with the pivoted support 231. A link 236 has one end pivoted to the lever 234 and the opposite end pivoted to an arm 237 attached to the rear end of a rod 238. The front end of the rod 238 has attached thereto an arm 239. A link 240 connects the arm 239 with an arm 241 attached to the rear end of the rod 28 which is rockable by operation of the lever 32. Thus, the lever 32 may be operated to move the support 231 downwardly far enough so that none of the cams 166 can engage the rollers supported by any of the levers 152, etc. This prevents the paper carriage from operating any of said levers.

A pin 242 rubs against an angular lever 243 mounted on a stationary pivot 244 and having a cam 245. Downward movement of the lever 234 will move the angular lever 243 and operate the cam against the arm 218, and thereby move the detent on which the shoulder 219 is formed far enough to hold said detent out of the line of movement of any of the cam arms 216. Therefore, the paper carriage is free to move back and forth for ordinary typewriting or other purposes without in any way moving or disturbing the carriage 208 or any of the other parts of the calculating machine. Return of the lever 32 to its former position will move the lever 234 upwardly and thereby move the pivoted support 231 upwardly and release the cam 245 from the arm 218 and recondition the calculating machine for operation by the typewriter digit keys under control of the paper carriage 1 and otherwise as described.

When an item is to be recorded and entered into any one of the calculating mechanisms, one of the cam blocks 215, by engagement with the shoulder 219, moves the carriage 208 along the rails 209 and thereby operates the lever 204 and the gear 213 to move the carriage 70. This movement of the carriage 70 places the pinions 75 in the proper denominational orders so that, when the first digit key is struck, the digit in the highest denominational order will be printed and entered into the corresponding calculating pinion 76. The paper carriage 1 will then move one letter space, thereby moving the carriage 70 to locate the pinions 75 at the next lower denominational order. When the second digit key is operated, the digit represented thereby will be printed on the paper in the paper carriage and entered into the calculating pinion 76 in the next lower denominational order, and these operations are repeated until the last digit in the item is entered; with the exception that, when the zero key is operated, the zero is printed on the paper in the paper carriage, the pinions 75 are shifted one step toward lower denominational orders, but are not rotated.

Figure 31:
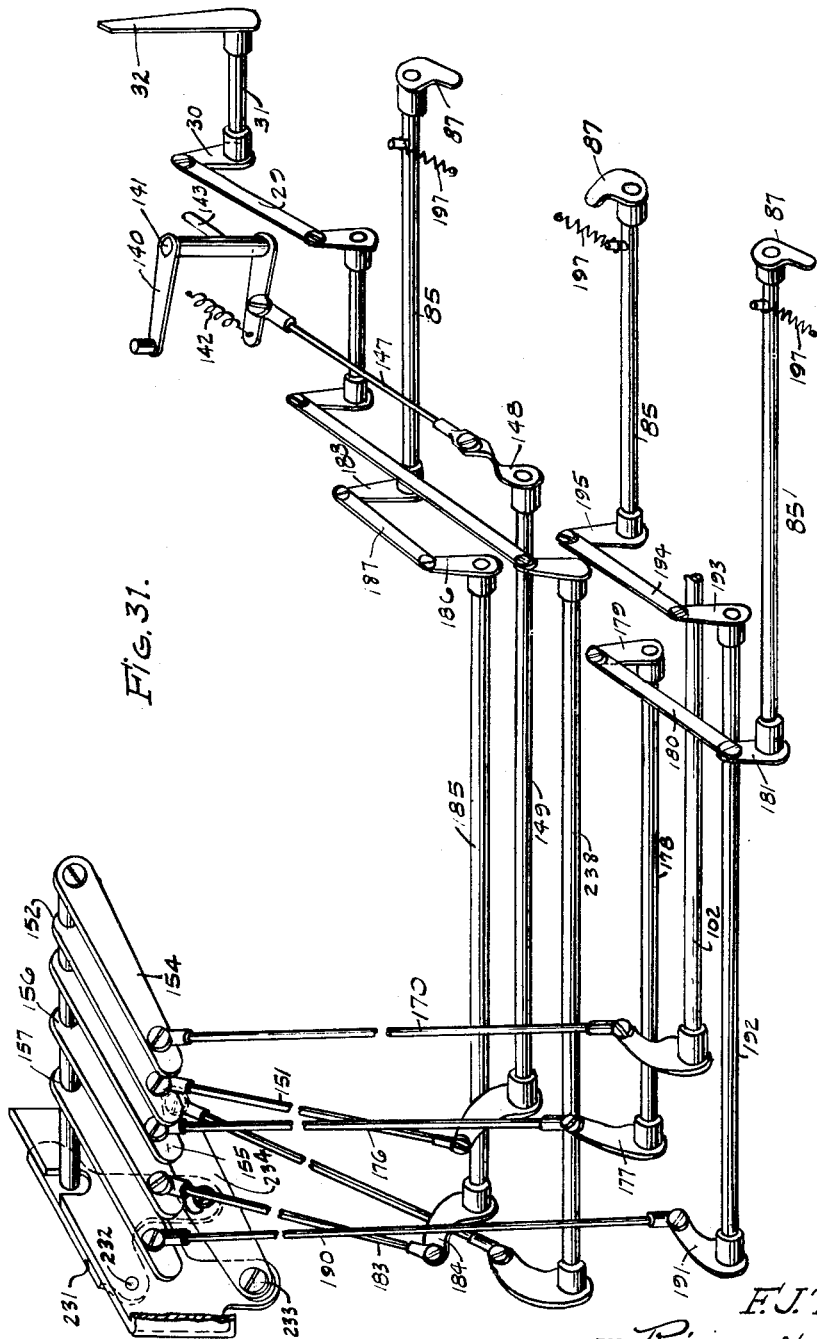
Fig. 31 is a perspective view showing connections controlled by the paper carriage of the typewriting machine for selecting the accumulators to be operated, and for operating the ribbon-shifting devices, etc.

A lever 246 is supported on a pivot 247 attached to one end of a stationary slotted plate 248 (Figs. 2 and 31). The slotted plate 248 functions to guide the free ends of the levers 152, 154, 155, 156 and 157 in their vertical swinging movements. A bracket 249, which is a duplicate of the brackets 158, 171, etc., is mounted by pin and slot arrangement 250 precisely the same as the pin and slot arrangement that supports said brackets 158, 171, etc., excepting that the roller 251 on the bracket 249 is toward the pivot 247, whereas the rollers on the brackets 158, etc. are toward the pivot 153. A spring 252 actuates the bracket 249 toward the free end of the lever 246. A link 253 connects the lever 246 with the lever 234 so that downward swinging movement of the lever 234 to swing the plate 245 and the levers 155, etc., supported thereby will also move to swing the lever 249 downwardly. One of the cam blocks 3 supports a cam like the cams 166 so that said cam, during movement of the paper carriage toward the right, will operate against the roller 251 and thereby depress the lever 246. During movement of the paper carriage toward the left in letter spacing or column spacing, the cam 166 will depress the bracket 249 without depressing the lever 246.

A link 254 has its upper end pivoted to the lever 246 and its lower end pivoted to one arm of an angular lever 255 (Fig. 9). The opposite arm of the lever 255 is connected by a link 256 with an arm 257 of a lever that is supported on a pivot 258. The connection of the link 256 with the arm 257 includes a slot 259 which permits the lever of which the arm 257 is a part to be operated independently of the link 256. The other arm 260 of the lever extends upwardly adjacent to one of the discs 62 so that, when the lever 246 is depressed, the arm 260 will be swung rearwardly and will lock the discs 62 and thereby the typewriter digit keys. A spring 261 is connected with the lever and operates to swing the arm 260 forwardly after the lever 246 has been released.

A cam 262 is attached to the rock shaft 212. The accumulator pinions 76 are spaced so that, when the paper moves one letter space, the pinions 75 move the same distance from a pinion 76 in one denominational order to a pinion 76 in the next lower denominational order, with the exception that the tens pinion 76 is spaced from the hundreds pinion 76 twice the distance of the space separating the remaining pinions. Therefore, after the digit in hundreds denominational order has been printed on the paper in the paper carriage and introduced into the proper calculating mechanism or mechanisms, it is necessary to shift the paper carriage, and thereby the pinions 75, two spaces in order to aline the pinions 75 with the pinions 76 in tens denominational order. To prevent error and to require the operator to shift the paper carriage 1 the proper distance of two spaces after the digit in hundreds denominational order has been entered, the typewriter digit keys are locked so that they cannot be operated. For this purpose, the cam 262 is caused to operate the lever arm 260 into locking engagement with the disc 62 immediately after the digit in hundreds denominational order has been entered. This prevents operation of any digit key 6 until the typewriter paper carriage has been shifted the two spaces necessary to aline the pinions 75 with the pinions 76. During movement of the typewriter paper carriage through the second letter space necessary to aline the pinions 75 with the pinions 76, the cam 262 passes beyond and releases the arm 260 and permits the spring 261 to disengage said lever arm from the disc 62. The digit keys 6 may then be operated successively to enter the tens and the units digits.

When the paper carriage is out of proper columnar position and the cam 166 holds the lever 246 depressed, it is impossible to operate any of the digit keys because the lever arm 260 is in locking engagement with the disc 62. This occurs when the paper carriage has been moved only a part of the distance toward its proper columnar position. An attempt to operate any digit key indicates to the operator the fact that the paper carriage is in proper position.

Fig. 25 illustrates a record or business form sheet suitable for use in this machine and having columns of records that may be written by this machine. The column F at the left bears the notation "Old balance." When the account was opened on January 17, that date was written in the column G. On that date, there was no old balance due by the customer, and so the item "00" is written at the top of the column F. The column I receives records to indicate the departments through which purchases are made, and the column J receives the names or a description of the merchandise purchased, or other appropriate entries. The column K receives the amounts charged for the items. The column L receives records of credits which the customer receives, and the next column M receives records of the balances due by the customer, or credits to which the customer is entitled if the credits exceed the amount of debits.

As indicated, on January 17, there was no old balance and the customer purchased one table and was charged $10.00. On the same date, the customer purchased one lamp and was charged $5.00 and one shade and was charged $2.50. These items were entered in the column K. The customer was entitled to and received no credits, the items "10 00" and "5 00" and "2 50" are recorded in the column K, and are added in two of the accumulators. Then the total amount,"17 50,"is entered in the column M and one of the accumulators is operated in subtracting this total from the total represented therein, thereby clearing that particular accumulator.

On January 22, this customer had an old balance of $17.50, which was recorded in column F, the date being recorded in column G, the identification of the department in which a new purchase was made being recorded in column I, the identification of the article purchased being recorded in the column J, the cost of the article, $2.50, being recorded in column K and added in the accumulator in which the old balance, $17.50, had been entered, making a grand total of $20.00, which is recorded in column M.

Thereafter, on January 25, as indicated in column G, the customer had an old balance against him of $20.00, as indicated in column F, and delivered or returned to department 8, as indicated in column I, merchandise as indicated in column J of the value of $50.00, as indicated in column L, exceeding the old balance or indebtedness of $20.00 by $30.00, and entitling him to a credit of $30.00, as indicated by the notation "CR30 00."

Thereafter, on January 28, as indicated in column G, the customer is entitled to a credit of $30.00, as indicated in column F, and purchases from department 10 certain merchandise as indicated in column J for which he is charged $40.00, as indicated in column K, and receives no credits, leaving the customer owing $10.00, as indicated in column M.

It is now apparent that any one or any two, or all, of the accumulators A, B and C may be placed in operation and operated during the performance of this work. This is because the machine is equipped with the manipulative connections 86 and also with the automatic connections controlled by the paper carriage and comprising the selectively adjustable cam blocks 3 supporting the cams 166 for moving the selected accumulators into cooperative relationship with the respective pinions 75. It should be clear that, by removing or otherwise disabling any of the cam blocks 3 with their cams 166, the selected accumulators may be left in inoperative positions, notwithstanding the shifting of the paper carriage across the different columnar positions; or, that by properly locating the cam blocks 3 with their cams 166, all or any number of the accumulators may be operated.

The items identified by and in alinement with the notation "CR" are recorded on the paper in the paper carriage, and introduced into the proper accumulators, either by subtraction or by addition, automatically and as an incident to operation of the machine after the credit balance key 108 has been depressed and is held in its depressed position during the entry of the item that is to be entered as a credit balance. Depression of the credit balance key 108 automatically, through the connections described, reverses the operation of the respective calculating mechanisms by causing the item to be subtracted from the calculating mechanism or mechanisms containing a positive total and added into the calculating mechanism or mechanisms containing a negative total. Thus, the operation of the calculating mechanism containing the positive total in column F is reversed when the credit balance item, $30.00, is entered, so that, after said item is completely entered, that particular calculating mechanism will indicate "10 00" instead of "20 00." And the calculating mechanism corresponding to column M will indicate a positive total of "10 00" instead of a negative total of "30 00." The connections controlled by the credit balance key 108 for effecting reversal of operation of these calculating mechanisms by shifting the pinion 68 from position in which it cooperates with the gear wheel 66 to the pinion 67, and vice versa, have been described and should be considered in this connection.

Each calculating mechanism may be cleared either by introducing therein the complementary number for a clearing operation or by a reverse operation thereof under control of the numeral keys of the same digital value and in proper sequence.

If a wrong item has been entered when the credit balance key is down, the error may be corrected by entering the same item while the credit balance key is up; and, vice versa, if a wrong item is entered while the credit balance key is up, the error can be corrected by entering the same item again while the credit balance key is held in its depressed condition.

As shown in Figs. 4, 5 and 6, a lock plate 263 may be pivoted on the rock rod 54. The lock plate 263 is actuated rearwardly by a spring 264 connecting said lock plate with a rearwardly extended arm 265 attached to the rock rod 54. Said spring 264 yieldingly holds the lock plate 263 against an abutment 266 formed on the arm 265 and acts to move the lock plate 263 rearwardly when the rod 54 is turned by the depression of any slide 14, as heretofore explained. When the lock plate 263 is swung rearwardly as described, it locks all of the slides 14 against downward movement, with the exception of that slide 14 that had been depressed and had not returned to its starting position. Each slide 14 is formed with a forward extension 14' beneath which the lock plate 263 is located when said lock plate is swung rearwardly. The lock plate does not move to locking position until that key connection 14 which is being operated has carried its extension 14' downwardly beyond position to be engaged by said lock plate. This lock plate does not immediately return to its starting position at the completion of the downward movement of any operated slide 14, but remains in locking position until the operated slide has moved a substantial distance toward its starting position. This affords ample time for the paper carriage 1 to move in letter-spacing before any additional numeral key can be operated. This prevents printing one digit upon another and requires that they be printed in accurately spaced relationship. Just before any operated slide 14 reaches its starting position, its extension 14' will rub against the rear inclined surface of the lock plate 263 and swing said lock plate 263 forwardly in opposition to the spring 264, thereby leaving the operated slide 14 free to return to its starting position.

From the foregoing, many or all of the various useful operations of this machine should be readily apparent. The construction and the arrangement and the combination of the parts and their cooperative relationship with each other may be widely varied within the scope of equivalent limits without departure from the nature and principle of this invention. In these particulars, I do not restrict myself beyond the scope of the appended claims, in which I claim:

1. In a calculating machine, a slide having a definite extent of movement from and to a starting position, a rack pivotally supported by said slide, a pinion mounted for rotation by said rack during movement of said slide from said starting position, a cam device movable to a position to engage and hold said rack positively in engagement with said pinion during movement of said slide from said starting position and movable to another position to engage and hold said rack out of engagement with said pinion during return movement of said slide to its starting position, and means for moving said cam to said last named position.

2. In a calculating machine, a slide having a definite extent of movement from and to a starting position, a rack pivotally supported by said slide for swinging movements in a plane parallel with and at the side of said slide, a pinion engageable by said rack for rotation thereby, a spring connecting said slide and rack for holding said rack in position for engagement with said pinion when said slide is moved from its starting position, a device supported apart from said slide and rack for holding said rack in engagement with said pinion during movement of said slide from said starting position and for holding said rack out of engagement with said pinion during return movement of said slide to its starting position, and an actuator supported apart from said rack for disengaging said rack from said pinion at the completion of the movement of said slide from starting position preparatory for engagement with said device during return movement of said slide to said starting position.

3. In a calculating machine, a slide having a definite extent of movement from and to a starting position, a rack pivotally supported by said slide, a pinion engageable by said rack for rotation thereby, a spring for holding said rack in position for engagement with said pinion when said slide is moved from its starting position, a device for engaging and holding said rack in positive engagement with said pinion during movement of said slide from said starting position and for holding said rack out of engagement with said pinion during return movement of said slide to its starting position, means apart from said device for disengaging said rack from said pinion at the completion of the movement of said slide from starting position preparatory for engagement with said device during return movement of said slide to said starting position, and means for moving said slide to its starting position and moving said device to position for engagement with said rack during return movement of said rack.

4. In a calculating machine, a longitudinally movable key operated slide having a definite extent of movement from and to a starting position, a rack pivotally supported by said slide, a pinion adapted to be engaged and rotated by said rack, a spring for holding said rack in position to engage with said pinion during movement of said slide from said starting position, an element for disengaging said rack from said pinion at about the completion of the movement of said slide from said starting position, and a device movable to position to engage and hold said rack positively out of engagement with said pinion during return movement of said rack.

5. In a calculating machine, a longitudinally movable key operated slide having a rectilinear movement from and to a starting position, a rack pivotally supported by said slide, a pinion adapted to be engaged and rotated by said rack, a spring for holding said rack in position to engage with said pinion during movement of said slide from said starting position, a device for positively holding said rack in engagement with said pinion after engagement therewith, an element for disengaging said rack from said pinion in a predetermined position of said rack, means for moving said device to a position to engage and hold said rack positively out of engagement with said pinion after said element has disengaged said rack from said pinion, and cooperating elements supported by said slide and said device preventing return movement of said slide until said element has disengaged said rack from said pinion.

6. In a calculating machine, a pair of slides each having a rectilinear movement from and to a starting position, a rack pivotally supported by each of said slides, pinions mounted for rotation by said racks during movement of said respective slides from said starting positions, devices for holding said racks in engagement with said pinions during movement of said slides from said starting positions and for holding said racks out of engagement with said pinions during return movement of said slides to their starting positions, an actuator for disengaging said racks from said pinions in predetermined positions of said racks, cooperating means supported by said slides and said devices preventing return of said respective slides to said starting positions until said racks have been disengaged from said pinions, and means controlled by said devices preventing effective movement of one slide from its starting position when the rack on the other slide is in engagement with the corresponding pinion.

7. In a calculating machine, a pair of slides each having a definite extent of rectilinear movement from and to a starting position, a rack movably mounted on each slide, pinions supported for engagement and rotation by said racks during movement of said respective slides from said starting position, means for holding said racks in position to engage said pinions, pivoted cams movable to one position to hold said racks in engagement with said pinions during movement of said slides from said starting position and movable to another position to hold said racks out of engagement with said pinions during return movement of said slides to their starting positions, and means controlled by said devices preventing movement of one slide from its starting position during movement of the other slide from its starting position.

8. In a calculating machine, a pair of slides supported for equal longitudinal movements from and to starting positions, extensions on said slides, a rod mounted for rocking movements, an element pivotally supported by each slide for turning said rod in one direction during final movements of either of said slides from its starting position and leaving said rod stationary during initial movements of said slides from said starting positions, a lock plate pivoted on said rod, a device carried by said rod for holding said lock plate disengaged from said slides when all of said slides are in their starting positions, and a spring for moving said lock plate under said extension on the unoperated slide to prevent movement thereof when the other one of said slides is moved from its starting position and leaving said rod free for further turning movement while said lock plate remains stationary under said extension of said unoperated slide.

9. In a calculating machine, a key operated slide movable longitudinally from and to a starting position, a rack pivotally supported at one side of said slide for swinging movements in a plane parallel therewith, a pinion engageable by said rack for rotation thereby, a part in connection with said rack engaging said slide to prevent movement of said rack in one direction relative to said slide when said rack is in position for engagement with said pinion, a spring connecting said rack and said slide and holding said rack in said position for engagement with said pinion during movement of said rack from said starting position, an element supported apart from said rack for disengaging said rack from said pinion before initiation of return movement of said slide, and a device apart from said rack and said element for engaging and holding said rack positively out of engagement with said pinion during return movement of said rack.

10. In a calculating machine, a slide, a key for operating said slide, a relatively movable rack supported by said slide, a rotary shaft, a pinion attached to said shaft for engagement with and rotation by said rack to rotate said shaft in one direction, a cam movable to one position to hold said rack in engagement with said pinion during operation of said slide by said key and movable to another position to engage and hold said rack out of engagement with said pinion during return movement of said key, and means apart from said cam for moving said rack out of engagement with said pinion near the end of movement of said slide from starting position preparatory for engagement with said cam during return movement of said slide to said starting position.

11. In a calculating machine, a slide movable longitudinally from and to a starting position, a depressible key for moving said slide from said starting position, a part supported by said slide for relative movement to and from an initial position, a spring holding said rack in said position during movement of said slide from starting position, a cam pivotally supported adjacent to said slide, means on said part for engaging and moving said cam to position to hold said part positively in said initial position during movement of said slide from said starting position, means for moving said cam to position to be engaged by said first named means and to hold said part out of said initial position during return movement of said slide to said starting position, ratchets formed in connection with said cam, and pawls supported on said slide cooperating with said ratchets in the respective positions of said cam to prevent opposite movement of said slide until a movement once initiated in either direction has been completed.

12. In a calculating machine, a slide movable longitudinally from and to a starting position, an element pivotally supported apart from and adjacent to said slide, two series of ratchet teeth formed on said element, two pawls pivotally mounted on said slide and cooperating with said respective series of ratchet teeth to prevent opposite movement of said slide until a movement initiated in either direction has been completed, and devices operated by said slide for moving said element from position in which one of said pawls engages one series of ratchet teeth to position in which the other pawl engages the other series of ratchet teeth, respectively.

13. In a calculating machine, a slide element movable longitudinally from and to a starting position, a cam element supported apart from and adjacent to said slide element, a member to be operated, a device supported by said slide element for movement thereby into engagement with said member during movement of said slide element from said starting position, cooperative means on said device and said cam element for moving said cam element to position to hold said device positively in engagement with said member during movement of said slide element from said starting position, an actuator for moving said cam element to position to be engaged by and to hold said device positively out of engagement with said member during return movement of said slide element to said starting position, two series of ratchet teeth supported by one of said elements, and two pawls supported by the other element and cooperating with said series of ratchet teeth, respectively, in said two positions of said cam element to prevent opposite movement of said slide element until a movement once initiated in either direction has been completed.

14. In a calculating machine, a slide movable longitudinally from and to a starting position, a pinion, a rack mounted on said slide for relative movements and for movement thereby into engagement with said pinion to rotate said pinion during movement of said slide from said starting position, a spring connecting said rack and said slide and holding said rack in position to engage said pinion, a cam element movable into two positions, cooperative parts on said rack and said cam element for positively holding said rack in engagement with said pinion during movement of said slide from starting position and for positively holding said rack out of engagement with said pinion during return movement of said rack, and a connection between said slide and said cam element for holding said cam element in proper position relative to said slide for cooperation of said parts during return movement of said slide.

15. In a calculating machine, a depressible key, a slide movable longitudinally from and to a starting position by said key, a pinion, a rack pivoted on said key for relative swinging movements to and from a position to engage said pinion, a spring for holding said rack in said position to engage said pinion, a pivoted cam supported apart from said slide positively holding said rack in engagement with said pinion during movement of said slide and rack from said starting position, means for disengaging said rack from said pinion about the end of the movement of said rack from said starting position and before return movement of said slide is initiated, and means for moving said cam to a position to engage and hold said rack out of engagement with said pinion during return movement of said slide and rack.

16. In a calculating machine, a slide having a rectilinear movement from and to a starting position, a rack pivotally attached to one side of said slide for relatively swinging movements in a plane parallel with said slide, a pinion mounted for rotation by said rack during movement of said slide from said starting position, a device movable to one position to engage and hold said rack in mesh with said pinion during movement of said slide from said starting position and movable to another position to engage and hold said rack out of engagement with said pinion during return movement of said slide to said starting position, means for swinging said rack out of engagement with said pinion and said device at the end of the movement of said slide from said starting position, and cooperating means supported by said slide and said movable device preventing return of said slide to said starting position until after said rack has been disengaged from said device and from said pinion.

17. In a calculating machine, a pair of slides having a definite extent of movement from and to a starting position, a rack pivotally carried by each of said slides intermediate of its ends for relative swinging movements in planes parallel with said slides, pinions mounted for engagement and rotation by said racks during movement of said respective slides from said starting position, a single two position cam for each rack, said cam in one position positively holding the associated rack in engagement with the complementary one of said pinions during movement of the respective slide from starting position and in the other position holding said rack out of engagement with said pinion during return movement of the slide to its starting position, means apart from said cams for disengaging said racks from said pinions preparatory for engagement with said cams during return movement of said slides to their starting positions, and means controlled by said cams preventing effective movement of one slide from its starting position when the rack on the other slide is in engagement with the corresponding pinion.

18. In a calculating machine, a series of slides supported for longitudinal movements from and to starting positions, a rack pivotally supported by each slide for swinging movements relative to and parallel with said slides, pinions engageable by said respective racks for rotation thereby during movement of said slides from said starting positions, parts in connection with said respective racks engaging the slides supporting them and preventing movement of said racks in one direction when said racks are in positions for engagement with said pinions, springs connecting said racks with said slides and yieldingly holding said racks in said positions for engagement with said pinions during movement of said racks from said starting positions, means for disengaging said racks from said pinions before initiation of return movement of said slides, a two position device for each rack, apart from said means, for engaging and holding the respective racks positively in engagement with said pinions during movement of said slides from starting positions in one position of said device and in the other position engaging and holding said racks positively out of engagement with said pinions during return of said slides and racks, and means, controlled by said devices in said one position, preventing simultaneous movement from starting position of more than one slide.

FERDINAND J. TILLMAN.